(12) United States Patent　　(10) Patent No.: US 8,422,830 B2
Nakamikawa et al.　　(45) Date of Patent: Apr. 16, 2013

(54) IMAGE PROCESSING SYSTEM WITH AN ADDRESS SNOOPING APPARATUS

(75) Inventors: Tetsuaki Nakamikawa, Hitachi (JP); Shoji Muramatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1492 days.

(21) Appl. No.: 11/971,942

(22) Filed: Jan. 10, 2008

(65) Prior Publication Data

US 2008/0170809 A1　　Jul. 17, 2008

(30) Foreign Application Priority Data

Jan. 11, 2007　(JP) ................................. 2007-003714

(51) Int. Cl.
  *G06K 9/54*　(2006.01)
  *G06F 21/00*　(2006.01)
  *G06F 15/00*　(2006.01)
(52) U.S. Cl.
  USPC .............................. 382/303; 711/146; 712/36
(58) Field of Classification Search .......... 382/302–303, 382/305, 307; 711/140–141, 119, 125, 205, 711/207; 712/36
  See application file for complete search history.

(56) References Cited

U.S. PATENT DOCUMENTS

| | | | | |
|---|---|---|---|---|
| 5,339,399 A | * | 8/1994 | Lee et al. ....................... | 711/146 |
| 5,685,005 A | * | 11/1997 | Garde et al. .................... | 712/36 |
| 5,890,217 A | * | 3/1999 | Kabemoto et al. ............. | 711/141 |
| 6,594,734 B1 | * | 7/2003 | Kyker et al. .................... | 711/146 |
| 6,633,975 B1 | | 10/2003 | Sawada et al. | |
| 7,574,582 B2 | * | 8/2009 | Nolan ............................... | 712/16 |
| 7,602,392 B2 | | 10/2009 | Nagao et al. | |
| 2004/0117558 A1 | * | 6/2004 | Krick et al. ..................... | 711/141 |

FOREIGN PATENT DOCUMENTS

| | | |
|---|---|---|
| JP | 2000-148999 | 5/2000 |
| JP | 3335482 | 8/2002 |
| JP | 2006-133839 | 5/2006 |
| JP | 2006-338505 | 12/2006 |

OTHER PUBLICATIONS

JP Office Action for Japanese Application No. 2007-003714, issued on Apr. 27, 2009.

* cited by examiner

*Primary Examiner* — Andrae S Allison
(74) *Attorney, Agent, or Firm* — Antonelli, Terry, Stout & Kraus, LLP.

(57) ABSTRACT

An image processing system includes a first image processor that reads out a first image written in a main memory to apply a first process to the first image and write in the main memory as a second image, a second image processor that reads out a second image written in the main memory to apply a second process to the second image and write in the main memory as a second image, and an address snooping apparatus that snoops an address of the image written in the main memory to start the first process when the address is indicated to a previously set first value and start the second process when the address is indicated to a previously set second value, effectively enabling synchronization between a process by a CPU or a special purpose processor and a data delivery/receipt process between pipeline stages.

4 Claims, 14 Drawing Sheets

FIG. 7

| IMAGE ID | AREA ADDRESS | | ACCESS MODE | RESOURCE | | | | | | | TRIGGER MODE | TRIGGER OFFSET | SNOOPING ADDRESS ENTRY |
| --- | --- | --- | --- | --- | --- | --- | --- | --- | --- | --- | --- | --- | --- |
| | START | END | | CPU0 | CPU1 | IP0 | IP1 | VI0 | VI1 | VO | | | |
| 0 | 0x10000000 | 0x1007FFFF | PIPE | | | R | | | | | INTERRUPT EXISTS (FORWARD), AI | 0x1E000 | 0 |
| 1 | 0x10080000 | 0x100FFFFF | PIPE | R | | W | | W | | | INTERRUPT EXISTS (FORWARD) | 0x3C000 | 1 |
| 2 | 0x10100000 | 0x1017FFFF | EXCLUSIVE RW | | | | | | | | — | — | — |
| ----- | ----- | ----- | ----- | ----- | ----- | ----- | ----- | ----- | ----- | ----- | ----- | ----- | ----- |

FIG. 9

| ENTRY | START | END | TOFST | TRIG | MODE | DEST | INTFLG | LAST |
|---|---|---|---|---|---|---|---|---|
| 0 | 0x10000000 | 0x1007FFFF | 0x1E000 | 0x1001E000 | INTERRUPT EXISTS (FORWARD),AI | IP0 | 0 | 0xFFFFFFFF |
| 1 | 0x10080000 | 0x100FFFFF | 0x3C000 | 0x100BC000 | INTERRUPT EXISTS (FORWARD) | CPU0 | 0 | 0xFFFFFFFF |

FIG. 14

| IMAGE ID | AREA ADDRESS | | ACCESS MODE | RESOURCE | | | | | | | TRIGGER MODE | TRIGGER OFFSET | SNOOPING ADDRESS ENTRY |
|---|---|---|---|---|---|---|---|---|---|---|---|---|---|
| | START | END | | CPU0 | CPU1 | IP0 | IP1 | VI0 | VI1 | VO | | | |
| 0 | 0x10000000 | 0x1007FFFF | PIPE | | | R | | W | | | INTERRUPT EXISTS (FORWARD), AI | 0x1E000 | 0 |
| 1 | 0x10080000 | 0x100FFFFF | PIPE | R | R | W | | | | | INTERRUPT EXISTS (FORWARD) | 0x3C000 | 1 |
| 2 | 0x10100000 | 0x1017FFFF | SHARED | RW | RW | | | | | | — | — | — |
| ----- | ----- | ----- | ----- | ----- | ----- | ----- | ----- | ----- | ----- | ----- | ----- | ----- | ----- |

FIG. 15

| ENTRY | START | END | TOFST | TRIG | MODE | DEST | INTFLG | LAST |
|---|---|---|---|---|---|---|---|---|
| 0 | 0x10000000 | 0x1007FFFF | 0x1E000 | 0x1001E000 | INTERRUPT EXISTS (FORWARD), AI | IP0 | 0 | 0xFFFFFFFF |
| 1 | 0x10080000 | 0x100FFFFF | 0x3C000 | 0x100BC000 | INTERRUPT EXISTS (FORWARD) | CPU0 CPU1 | 0 | 0xFFFFFFFF |

IMAGE PROCESSING SYSTEM WITH AN ADDRESS SNOOPING APPARATUS

BACKGROUND OF THE INVENTION

The present invention relates to an image processing technique, and particularly to an image processing technique capable of effectively using a plurality of image processors.

For a purpose of speeding up an image process, such process in the past has been performed so that it can be distributed to a plurality of image processors. As a method of distributing the process, a so-called pipeline architecture has been known so that the process can be divided into a plurality of stages, and data is sent to a subsequent stage at every end of the process for each divided stage. This architecture has been disclosed in Japanese Patent N. 3335482 and JP-A-2006-133839.

In the case of pipeline architecture, there is an idea to perform a data delivery/receipt between the stages effectively. The Japanese Patent No. 3335482 facilitates an enhancement of a processing efficiency by varying a connection between an image processor and an image line memory. The JP-A-2006-133839 also facilitates an enhancement of a processing efficiency by providing a dual-port memory between image processors.

Generally speaking, in the case of the pipeline process in the image process, the pipeline process includes an architecture which hands a process over to a subsequent stage at a time of completing the process for one-screen data amount. However, the pipeline process in the present invention means that a process is handed over to a subsequent stage before completing the process for the one-screen data amount.

That is, in the former case, one image processor accesses the one-screen data amount exclusively. In the latter case (present invention), a plurality of image processors sometimes access the one-screen data amount at a time.

SUMMARY OF THE INVENTION

In the case where the pipeline is constituted by a hardware as disclosed in the Japanese Patent No. 3335482, execution cycles for each stage of the pipeline is constant. For this reason, data between the stages can be delivered and received effectively by a relatively simple hardware, such as an image line memory using a shift register.

On the other hand, in the case where the pipeline process is realized by using a plurality of image processors which are controlled by a program in a CPU, the execution cycles for each of the stages are not constant. Because of this, it is difficult to use a hardware based on an assumption of access by a fixed cycle such as an image line memory, in order to deliver and receive data between the stages.

Consequently, the idea is proposed so that the dual-port memory is provided between CPUs, as disclosed in JP-A-2006-133839. However, in the case where the CPU is used for the pipeline process as described above, there is no means to know directly how far the process runs in each of the stages, even though the delivery and receipt of data is performed through either the dual-port memory or a main memory. For this reason, in the case of JP-A-2006-133839, the CPU writes an address of processed data in the dual-port memory by a program manipulation to take synchronization between the stages. Therefore, the process becomes complicated.

The invention is made in light of the foregoing problem. An object of the invention is to provide an image processing technique capable of effectively synchronizing a process by a CPU or a special purpose processor with a data delivery/receipt process between pipeline stages.

The invention employs the following means to solve the foregoing problem.

According to the invention, an image processing system includes a plurality of image processors having a CPU and a management table to manage an access right to image data arranged on a memory used by the image processors, in which a series of image processes are performed by cooperating the plurality of image processors in accordance with the access right. The image processing system provides: a pipeline processing mode that enables a write given to image data to be set in the management table by one image processor as a type of the access right and a read from one or more image processors; an address snooping device provided on a bus accessible to a memory for storing the image data to snoop a write address in relation to the memory through the bus, and means that judges whether the write address becomes a previously set value in the management table.

According to the foregoing constitution, the invention provides an image processing technique capable of effectively synchronizing a process by a CPU or a special purpose processor with a data delivery/receipt process between pipeline stages.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram for explaining a constitution of an image management table;

FIG. 9 is a diagram showing register setting contents of the address snooping apparatus;

FIG. 14 is a diagram for explaining a setting of an image management table in a second embodiment;

FIG. 15 is a diagram showing a register setting in the address snooping apparatus in the second embodiment;

DESCRIPTION OF THE EMBODIMENTS

[First Embodiment]

Figure 1:
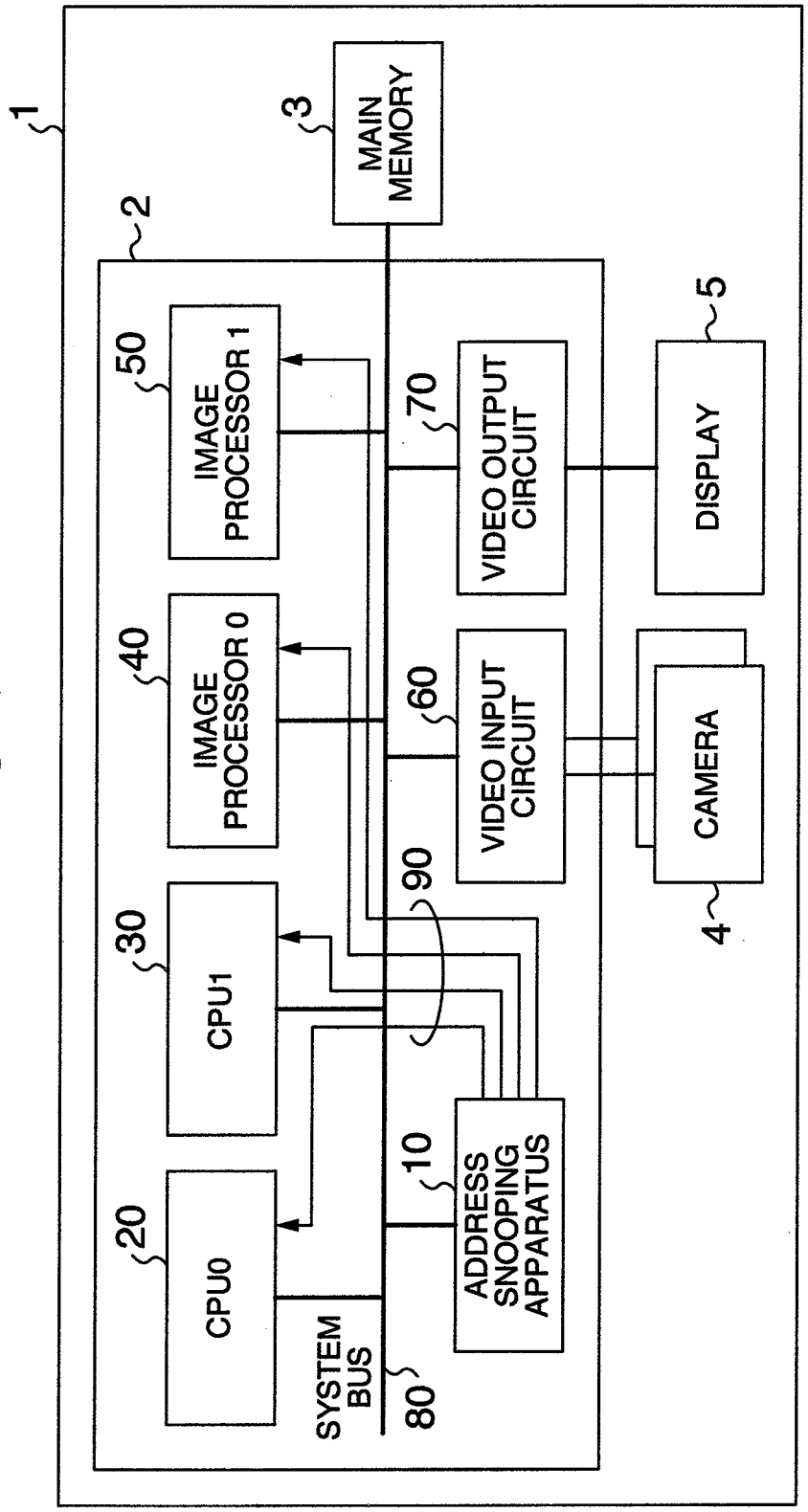
FIG. 1 is a diagram for explaining an entire constitution of an image processing system in a first embodiment.

Hereinafter, a first embodiment of the invention will be described with reference to FIG. 1 to FIG. 12. FIG. 1 is a diagram for explaining an entire constitution of an image processing system in the embodiment. As shown in FIG. 1, an image processing system 1 includes a system LSI 2, a main memory 3, a camera 4, and a display 5. The system LSI 2 houses an address snooping apparatus 10, CPUs 20, 30, image processors 40, 50, a video input circuit 60, a video output circuit 70, a system bus 80 connected with the foregoing components, and an interrupt signal line 90.

The CPUs 20, 30 are general-purpose processors, which constitutes a multiprocessor. The image processors 40, 50 are special purpose processors for image processing, and controlled by either the CPU 20 or 30. The main memory 3 stores programs and data such as images.

The video input circuit 60 writes image data inputted from the camera 4 in the main memory 3. The video output circuit 70 reads out drawing data present in the main memory 3 to display on the display 5. The address snooping apparatus 10 snoops an address of data to be written in the main memory 3 through the system bus 80, and generates an interrupt to either the CPU 20 or 30, or either the image processor 40 or 50 through the interrupt signal line 90 in response to a predetermined set condition.

Figure 2:
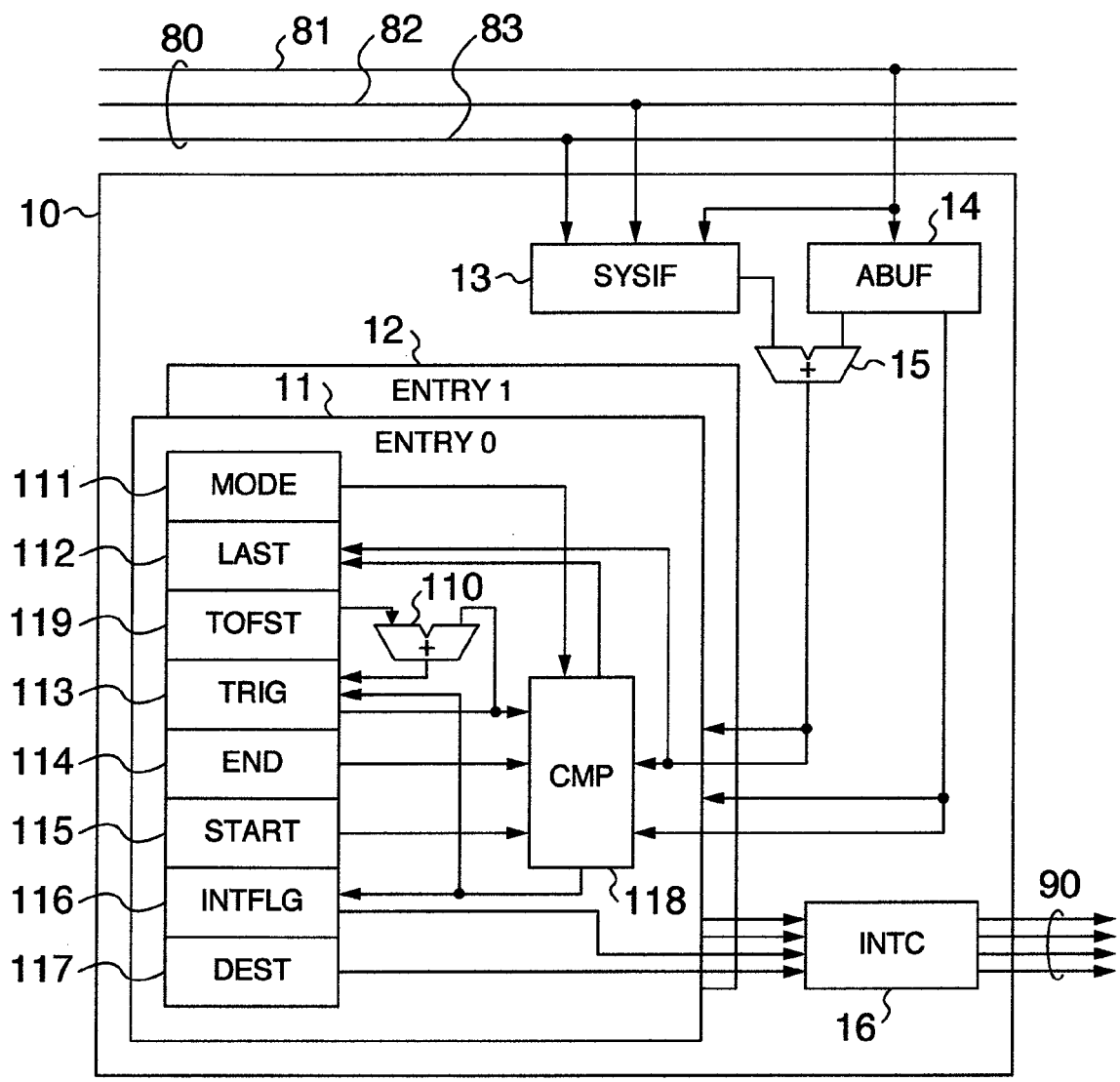
FIG. 2 is a diagram for explaining an internal constitution of an address snooping apparatus.

FIG. 2 is a diagram showing an internal constitution of the address snooping apparatus 10 which includes address snooping entries 11, 12, a system interface circuit 13, an address buffer 14, an address adder 15, and an interrupt distribution circuit 16. The address snooping entry 11 includes a mode register (MODE) 111, a last written address register (LAST) 112, a trigger address register (TRIG) 113, an area end address register (END) 114, an area start address register (START) 115, an interrupt flag register (INTFLG) 116, an interrupt destination register 117, an address comparator 118, a trigger offset register (TOFST) 119, and a trigger offset adder 110. The address snooping entry 12 also includes the same constitution as the snooping address entry 11.

The system interface circuit 13 is connected with an address signal line 81, a data signal line 82 and a control signal line 83, as constituted of the system bus 80, and accepts an access to an address assigned to a control of the address snooping apparatus 10 to execute a read/write operation for each of the registers in the address snooping entry 11. Further, when a write operation is executed to the main memory 3 through the system bus 80, the system interface circuit 13 indicates to the address buffer 14 connected to the address signal line 81 to fetch an address, and sends a write length (number of bytes) to the address adder 15 to calculate a last written address. The respective registers, START 115, END 114 and TRIG 113, hold an address to be compared with a write address. The LAST 112 holds an address lastly written in the area. The MODE 111 stores conditions indicating whether an interrupt is generated at a time of effecting a trigger, whether a trigger effected condition is "equal to or greater than a trigger address" or "equal to or less than a trigger address", and whether a trigger address is increment automatically after effected a trigger condition. The INTFLG 116 holds a condition on the interrupt when an interrupt generated condition is effected. The DEST 117 holds a condition for which of the image processors corresponds to an interrupt destination. The TOFST 119 holds an area size to be increment automatically. When the automatic increment is executed, the trigger offset adder 110 adds a value of the TOFST 119 to a value of the TRIG 113 to create a new trigger address.

Figure 3:
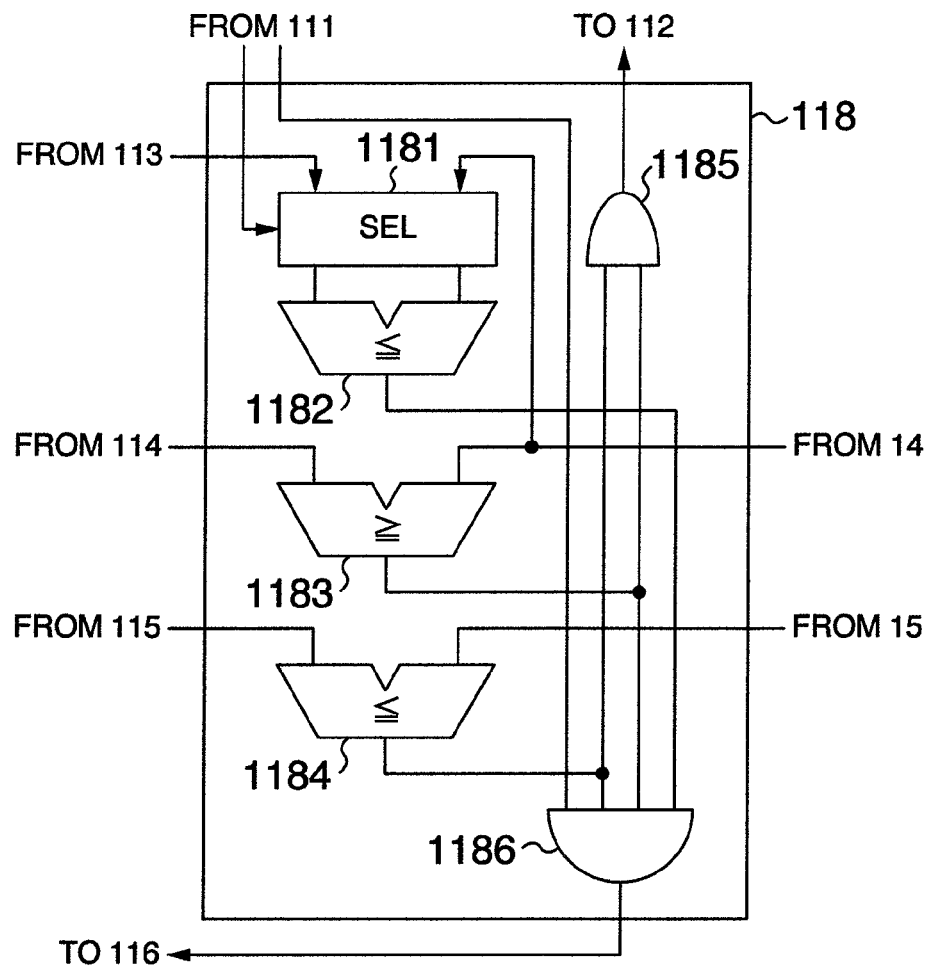
FIG. 3 is a diagram for explaining an internal constitution of an address comparator.

FIG. 3 is a diagram for explaining an internal constitution of the address comparator 118 which includes a selector 1181, address comparators 1182, 1183, 1184, an area hit judging circuit 1185, and a trigger hit judging circuit 1186.

The address comparator 1184 compares a write address given by the address buffer 14 with an area start address given by the START 115. The address comparator 1183 compares the last written address given by the address adder 15 with an area end address given by the END 114. The address comparator 1182 compares the last written address given by the address adder 15 with the trigger address given by the TRIG 113.

Two inputs of the address comparator 1182 are swapped by the selector 1181 in accordance with a mode signal given by the mode register MODE 111, so that a comparison condition is switched to either "the last written address is equal to or greater than the trigger address" or "the last written address is equal to or less than the trigger address."

The trigger hit judging circuit 1186 notifies a condition effect to the interrupt flag register INTFLG 116 when all of the conditions of an interrupt generated mode from the MODE 111 and of the address comparators 1182, 1183 and 1184 are satisfied. The area hit judging circuit 1185 notifies the condition effect to the last written address register LAST 112 when all of the conditions of the address comparators 1183 and 1184 are satisfied.

Figure 4:
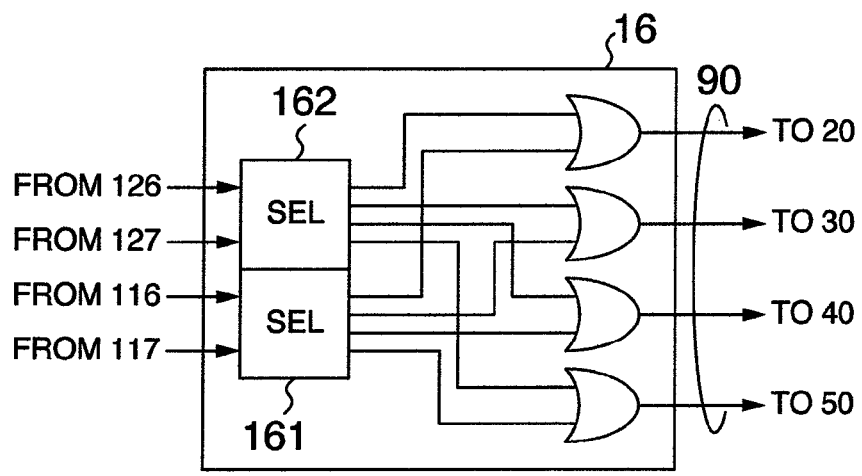
FIG. 4 is a diagram for explaining an internal constitution of an interrupt distribution circuit.

FIG. 4 is a diagram for explaining an internal constitution of the interrupt distribution circuit 16 which includes selectors 161 and 162. The selector 161 distributes an interrupting condition notified from the interrupt flag register INTFLG 116 to an interrupt destination given by the interrupt destination register DEST 117. The selector 162 distributes an interrupting condition notified from an INTFLG 126 to an interrupt destination given by a DEST 127.

The INTFLG 126 (not shown) and DEST 127 (not shown) are present in the address snooping entry 12, and have the same function as the INTFLG 116 and DEST 117.

The description up to now has been concerned with the constitutional elements to be realized by the hardware. Next, a data structure associated with an operation of the hardware components will be described with use of FIGS. 5, 6 and 7.

Figure 5:
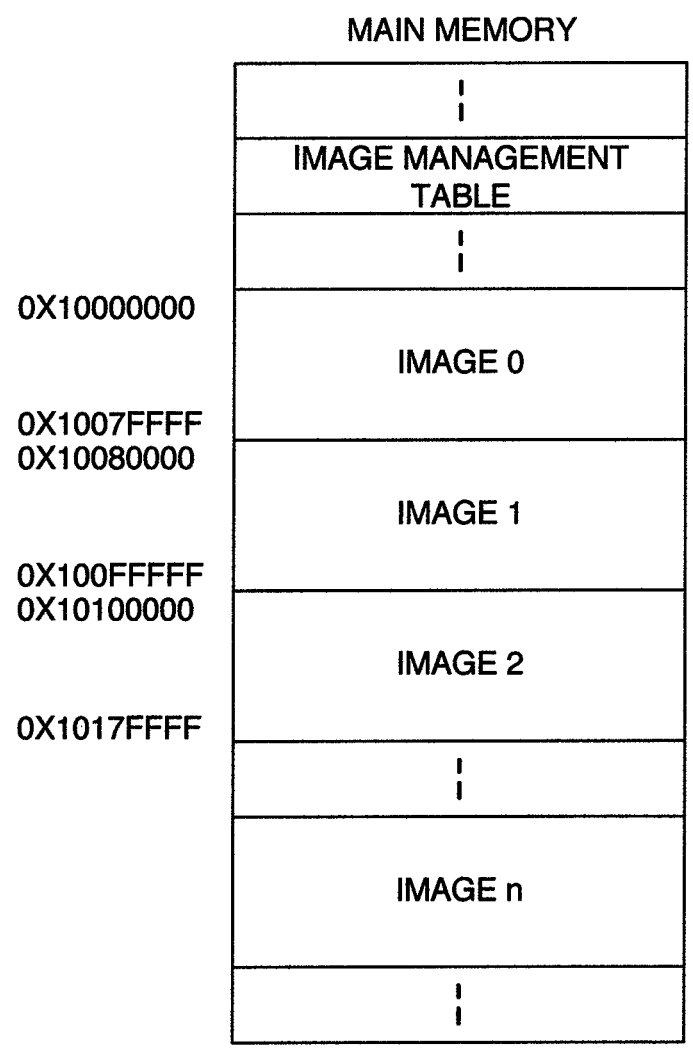
FIG. 5 is a diagram showing a memory map of a main memory.
Figure 6:
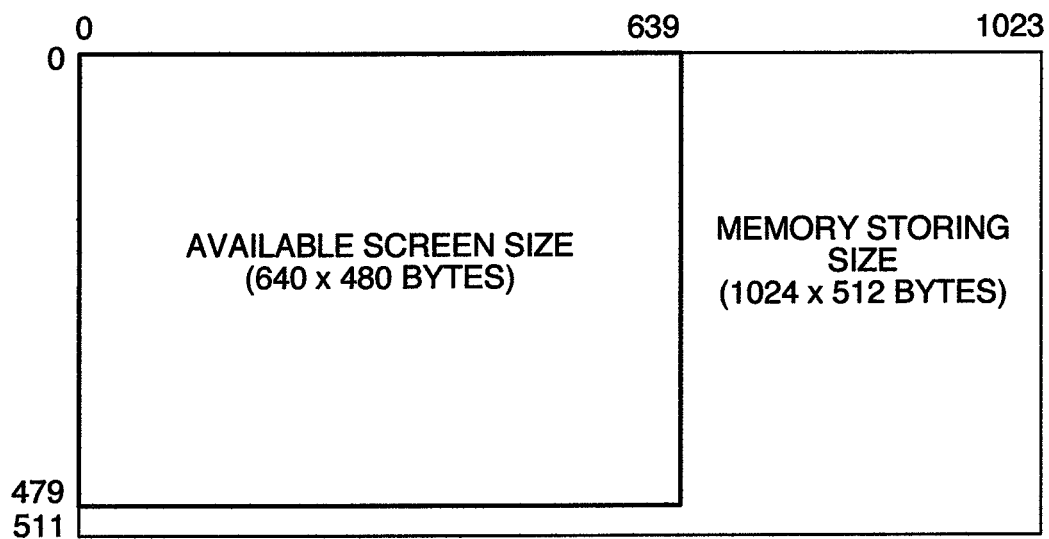
FIG. 6 is a diagram for explaining a processing image size and a memory storing format.

FIG. 5 shows a memory map of the main memory 3. Image data is managed by using an image management table stored in the main memory 3 and a management program to be executed by either the CPU 20 or CPU 30. Further, FIG. 6 shows a processing image size and a memory storing format for use in the embodiment.

FIG. 7 is a diagram for explaining a structure of the image management table. Each of the images is assigned with a unique number as an image-ID, an area start address, an end address, an access mode, an access resource, a trigger mode, a trigger offset, and an address snooping entry. Therefore, the image is managed by every image-ID.

The access mode indicates whether an access to the image is restricted to one resource (exclusive mode), and whether a write is permitted from the one resource and a read is permitted from the other resources (pipeline mode).

The access resource permits an access to the image of either one of a read-out (R), a write (W), and a read/write (RW) to the respective resources including the CPUs 20, 30 (CPU0, CPU1), the image processors 40, 50 (IP0, IP1), the video input circuit 60 (VI0 and VI1 because of a camera having two-input system), and the video output circuit 70 (VO).

When the access mode is the pipeline mode, three fields of the trigger mode, trigger offset, and address snooping entry are effective. The trigger mode indicates whether an interrupt is generated when the trigger condition is effective in the address snooping apparatus 10, and indicates a comparison mode (either a forward addressing or backward addressing) of the trigger condition which is set in the MODE 111. The trigger offset indicates a time when a trigger is given by how far the process runs from a start of the image. The address snooping entry indicates either the address snooping entry 11 or 12 is used.

Next, an operation of the pipeline process will be described with use of the foregoing hardware and data structure. In this embodiment, an image inputted from the camera 4 is stored, as an "image 0", in the main memory 3 by the video input circuit 60.

The "image 0" is processed by the image processor 40. A result of the process is stored in the main memory 3 as an "image 1." The foregoing steps are processed by the CPU 20. A result of the process is stored in the main memory 3 as an "image 2." The processes for the "image 0" and "image 1" are performed by a pipeline.

Figure 8:
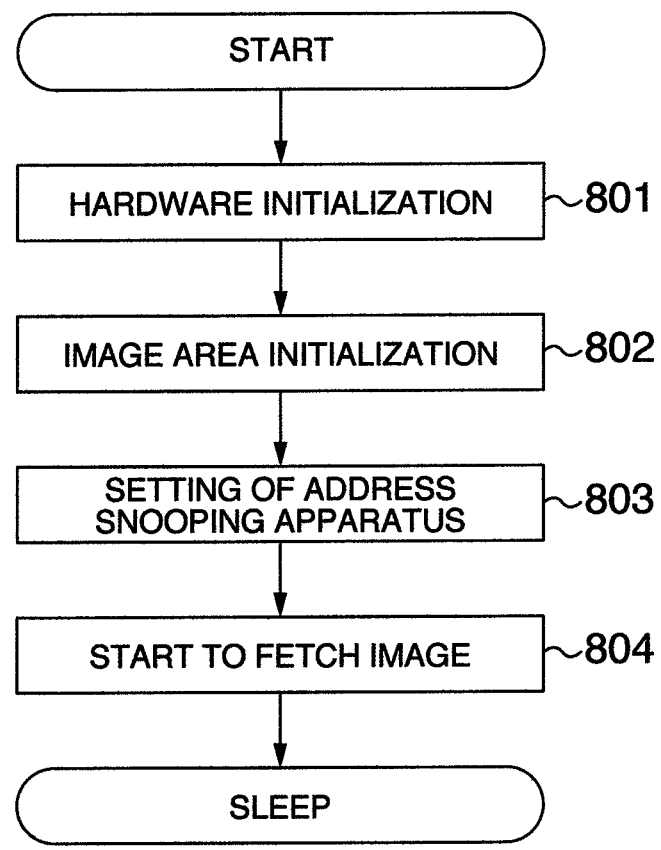
FIG. 8 is a flow chart for explaining a process of an image processing main program executed by a CPU.

FIG. 8 is a flow chart for explaining a process of an image processing main program executed in the CPU 20. In step 801, an initial setting is executed for the hardware, such as the image processors 40, 50, the video input circuit 60, and video output circuit 70. In step 802, a setting of the image management table is executed. In step 803, a setting of the address snooping apparatus 10 is executed in accordance with the setting of image management table.

In step 804, the video input circuit 60 is started. Thereafter, the CPU 20 is turned to a sleep, and to an interrupt pending state from the address snooping apparatus 10.

In the step 802, a setting is executed as shown in FIG. 7. That is, the image-ID is defined as three areas 0, 1, 2. The image 0 is written by the video input circuit VI0 in accordance with the pipeline mode, and read out by the image processor IP0. When the access proceeds to 0XLE000 or 120th line from a start address, an interrupt is generated to make the trigger address to be increment automatically and use the address snooping entry 11. The image 1 is written by the image processor IP0 in accordance with the pipeline mode, and read out by the CPU0. When the access proceeds to 0X3C00 or 240th line, an interrupt is generated to use the snooping address entry 12. The image 2 is read and written by the CPU0 in accordance with the exclusive mode.

In the step 803, a setting is executed as shown in FIG. 9. FIG. 9 is a diagram showing a list of register setting contents in the address snooping apparatus 10. An entry 0 is set with a start address (0X10000000) of the image 0, an end address (0X1007FFFF), a trigger offset value (0X1E000), a trigger address (0X1001E000) by adding the trigger offset to the start address, interrupt and trigger comparison modes (an interrupt exists, forward addressing, an automatic increment exists), an interrupt destination (IP0), an interrupt clear (0 is written in INTFLG), and a last written address clear (0XFFFFFFFF is written in LAST). An entry 1 is set with a start address (0X10080000) of the image 1, an end address (0X100FFFFF), a trigger offset value (0X3C000), a trigger address (0X100BC000) by adding the trigger offset to the start address), interrupt and trigger comparison modes (an interrupt exists, forward addressing), an interrupt destination (CPU0), an interrupt clear (0 is written in INTFLG), and a last written address clear (0XFFFFFFFF is written in LAST).

Figure 10:
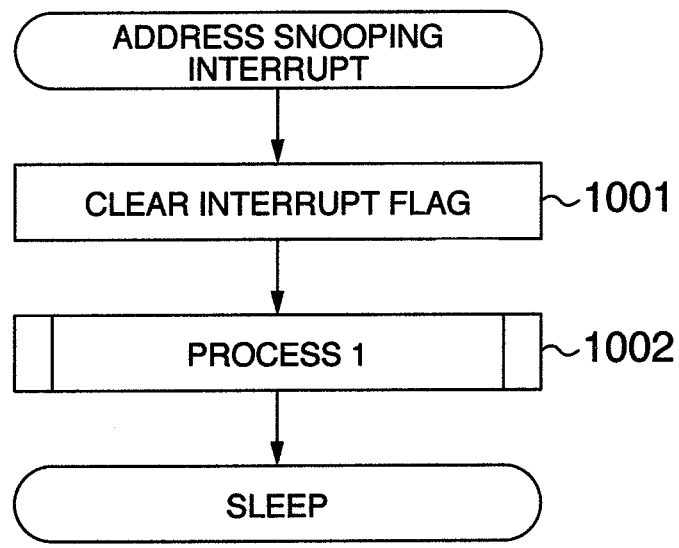
FIG. 10 is a flow chart for explaining an image process executed by an image processor.

FIG. 10 is a flow chart for explaining an image process executed by the image processor 40. This process is executed internally by the hardware of the image processor 40. In addition, what a process is executed by the image processor 40 has already been set by the step 801 shown in FIG. 8. The process starts when an interrupt is inputted from the address snooping apparatus 10 through the interrupt signal line 90. First, in step 1001, 0 is written in the INTFLG of address snooping entry 11 to make an interrupt status clear. After that, a previously set image process is executed, and the step is turned to a sleep after completing the process. In the embodiment, the image process executed in now is referred to as a "process 1" (step 1002). This process reads the image 0 as an input and writes a result obtained from a filtering process in the image 1. In addition, the present invention does not depend on what a type of the process is concerned with this case.

Figure 11:
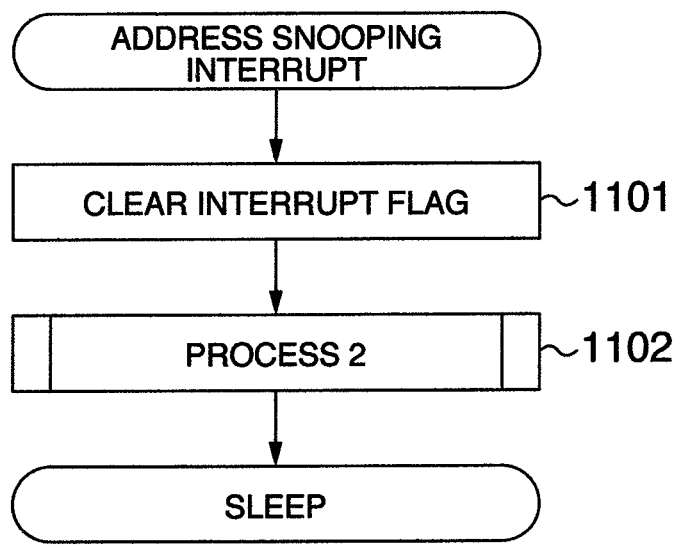
FIG. 11 is a flow chart for explaining an image process executed by the CPU.

FIG. 11 is a flow chart for explaining an image process executed in the CPU 20. This process is executed by software in the CPU 20. The process starts when an interrupt is entered from the address snooping apparatus 10 through the interrupt signal line 90. First, in step 1101, 0 is written in the INTFLG of the address snooping entry 12 to make an interrupt status clear. After that, a previously set image process is executed. The step is then turned to a sleep after completing the process. In this embodiment, the image process executed in now is referred to as a "process 2" (step 1102). This process reads the image 1 as an input and writes a result obtained from an image recognition process in the image 2. In addition, the present invention does not depend on what a type of the process is concerned with this case. Further, it is also possible that another task is assigned by an OS after the process is completed and the step is turned to a sleep. In this case, a usability of the CPU is improved.

Figure 12:
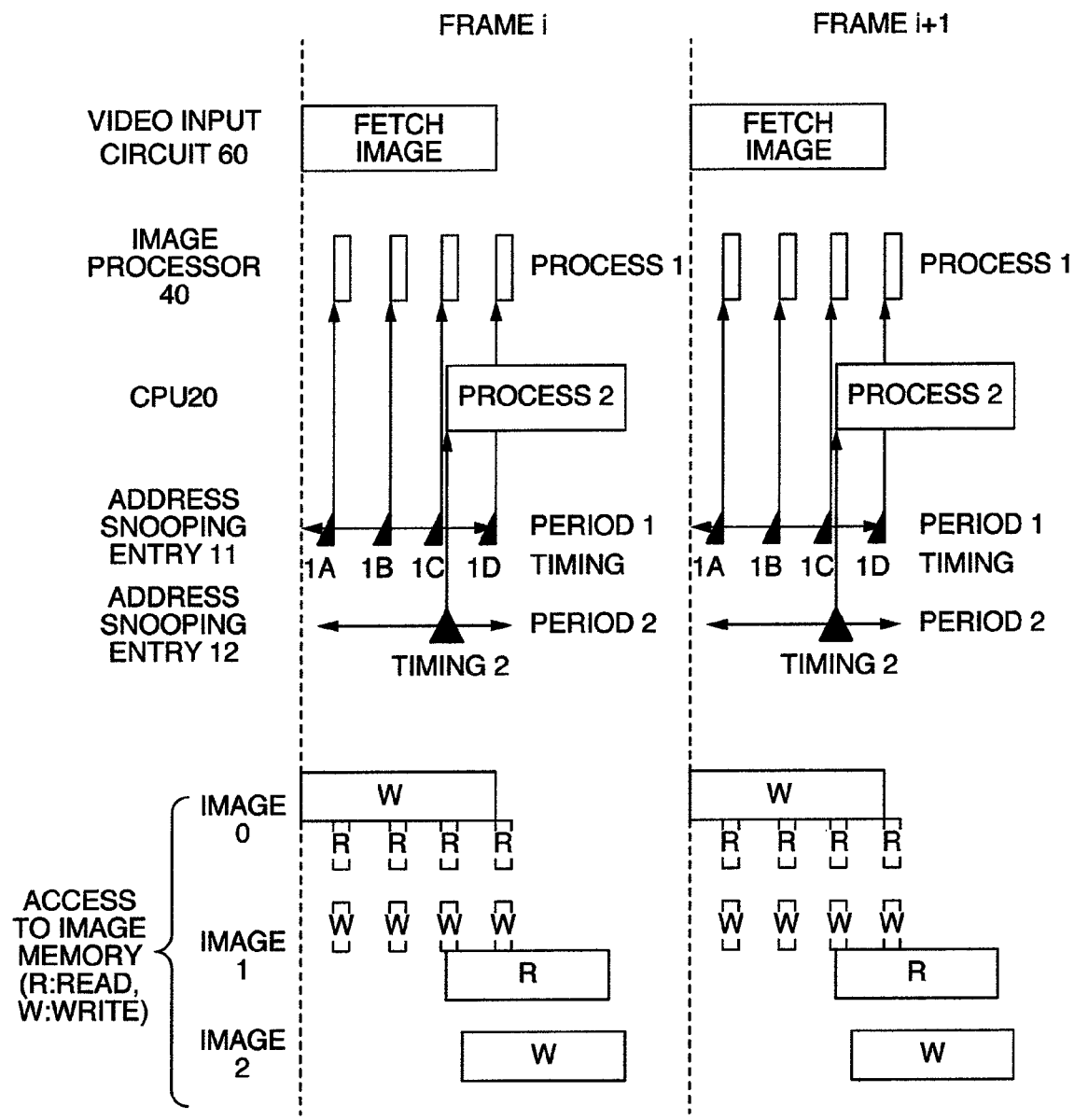
FIG. 12 is a timing chart showing an aspect of the image process.

FIG. 12 is a timing chart showing an aspect of the image processing execution in the embodiment.

When the video input circuit 60 writes an input image in a memory area of the image 0, a write address is adapted so that it hits the address snooping entry 11 of the address snooping apparatus 10 during a period 1 shown in FIG. 12. When the write address in turn increases to match with the trigger address at a point of a timing 1A, an interrupt enters to the image processor 40. At this time, the trigger address of the address snooping entry 11 is increment automatically. That is, a value of the trigger offset register TOFST 119 is added to the TRIG 113, and is re-written in the TRIG 113 (this makes a next trigger address to be set to a point of a timing 1B. Similarly, the trigger address is set to points of timings 1C, 1D at every increment).

The process shown in FIG. 10 is executed by the interrupt to write a result in the area of image 1. When the write operation in the area of image 1 is executed, the write address is adapted so that it hits the address snooping entry 12 of the address snooping apparatus 10. When the write address in turn increases to match with the trigger address at a point of a timing 2, an interrupt enters to the CPU 20. The process shown in FIG. 11 is executed by the interrupt to write a result in an area of the image 2. FIG. 12 illustrates that such a series of the processes are executed in synchronization with a capturing period (video frame period) obtained from the camera 4.

A lower half (access to an image memory) of FIG. 12 indicates as to which of the timings adapts to generate an access to the image memory, that is, the write and read are executed for one image simultaneously. It is appreciated that the pipeline process is realized as an object of the invention. In addition, whether the automatic increment function for the trigger address is used, which depends on a ratio of processing speed at the front and rear stages of the pipeline. That is, if the processing speed of the rear stage is faster than that of the front stage, the rear stage is turned to a sleep after executing a certain amount of processes and can wait until processing data from the front stage is set, since the process run at the rear stage is faster than the setting of the processing data at the front stage. For that period, the image processor at the rear stage can execute other processes. On the other hand, if the processing speed of the rear stage is slower than that of the front stage, it is not necessary to use the automatic increment function since the process at the front stage is not passed behind, even though the process at the rear stage starts by the trigger at a time of setting the minimum amount of data.

[Second Embodiment]

Next, a second embodiment will be described with use of FIG. 1 to FIG. 5, FIG. 8, FIG. 10, FIG. 11, and FIG. 13 to FIG. 16. A constitution of hardware and a data structure are the same as the first embodiment.

In this embodiment, an image inputted from the camera 4 is stored, as an "image 0", in the main memory 3 by the video input circuit 60. The "image 0" is processed by the image processor 40. A result of the process is stored in the main memory 3 as an "image 1." The foregoing steps are processed by the CPU 20 and CPU 21, both of which take a division of roles. A result of the process is stored in the main memory 3 as an "image 2." In this way, the processes for the image 0 and image 1 are executed by the pipeline.

Figure 13:
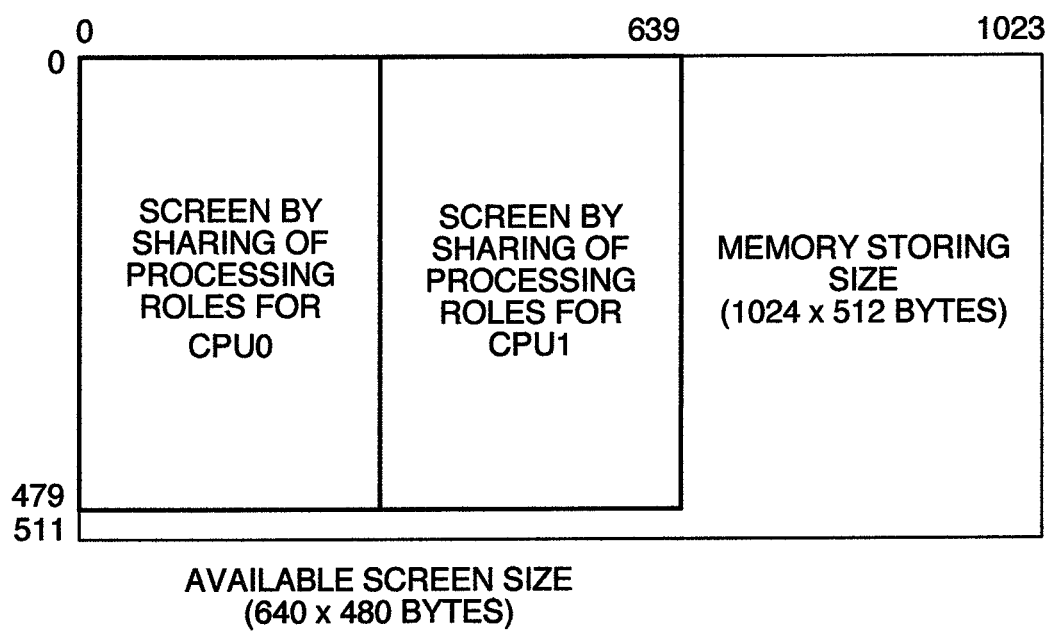
FIG. 13 is a diagram for explaining an image processing size and a memory storing format in a second embodiment.

FIG. 13 is a diagram showing a processing image size, a memory mapping format, and a sharing of processing roles of the CPUs, in which the left half of image is processed by the CPU 20 and the right half thereof is processed by the CPU 21.

FIG. 14 is a diagram for explaining a setting of the image management table in the embodiment. What a difference from the first embodiment is that the image 2 is set to a shared mode to permit a simultaneous write and read from the CPU 20 and CPU 21.

FIG. 15 is a diagram showing a list of register settings in the address snooping apparatus 10 in the embodiment. What a difference from the first embodiment is that a setting to the interrupt destination in an entry 1 indicates the CPU 20 and CPU 21. In addition, the interrupt flag register (INTFLG) 116 is divided by every interrupt, so that an interrupt status can be made independently clear for each of the CPU 20 and CPU 21.

Figure 16:
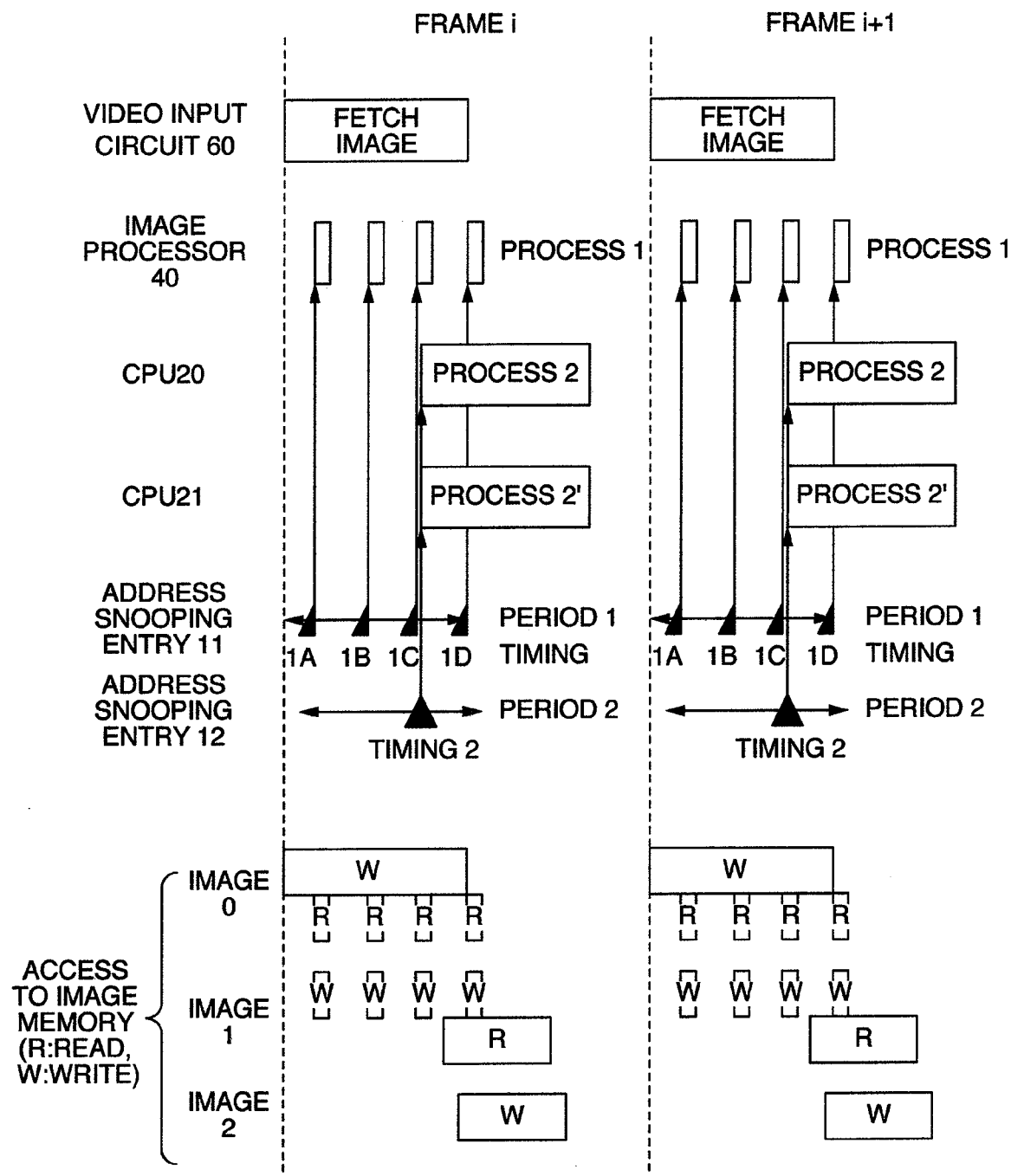
FIG. 16 is a timing chart showing an aspect of an image process in the second embodiment.

FIG. 16 is a timing chart showing an aspect of an image processing execution in the embodiment. What a difference from the first embodiment is that an interrupt enters simultaneously to the CPU 20 and CPU 21 at a timing 2. This makes the CPU 20 and CPU 21 to start a process for the left half or the right half of the images, as each of the sharing of processing roles. In addition, a "process 2'" processed by the CPU 21 is only different in a processing address of a "process 2" processed by the CPU 20. However, the sharing of processing roles for the same process is not an object of the present invention, that is, different processes may be executed by the CPU 20 and CPU 21, respectively.

The second embodiment has been described so far, but the description other than this embodiment is omitted since it is the same as that in the first embodiment. In this way, the pipeline process is also realized as an object of the invention in the second embodiment, and a distributed process enables by the two CPUs, so that the processing time can be reduced. In addition, the process is divided into the left half and right half of the image in this embodiment. However, if the image does not straddle over a cache line aligning (for example, every 32 bytes) of the CPU when dividing the process, a memory coherency is ensured even though the image is written in the same image area.

[Third Embodiment]

Figure 17:
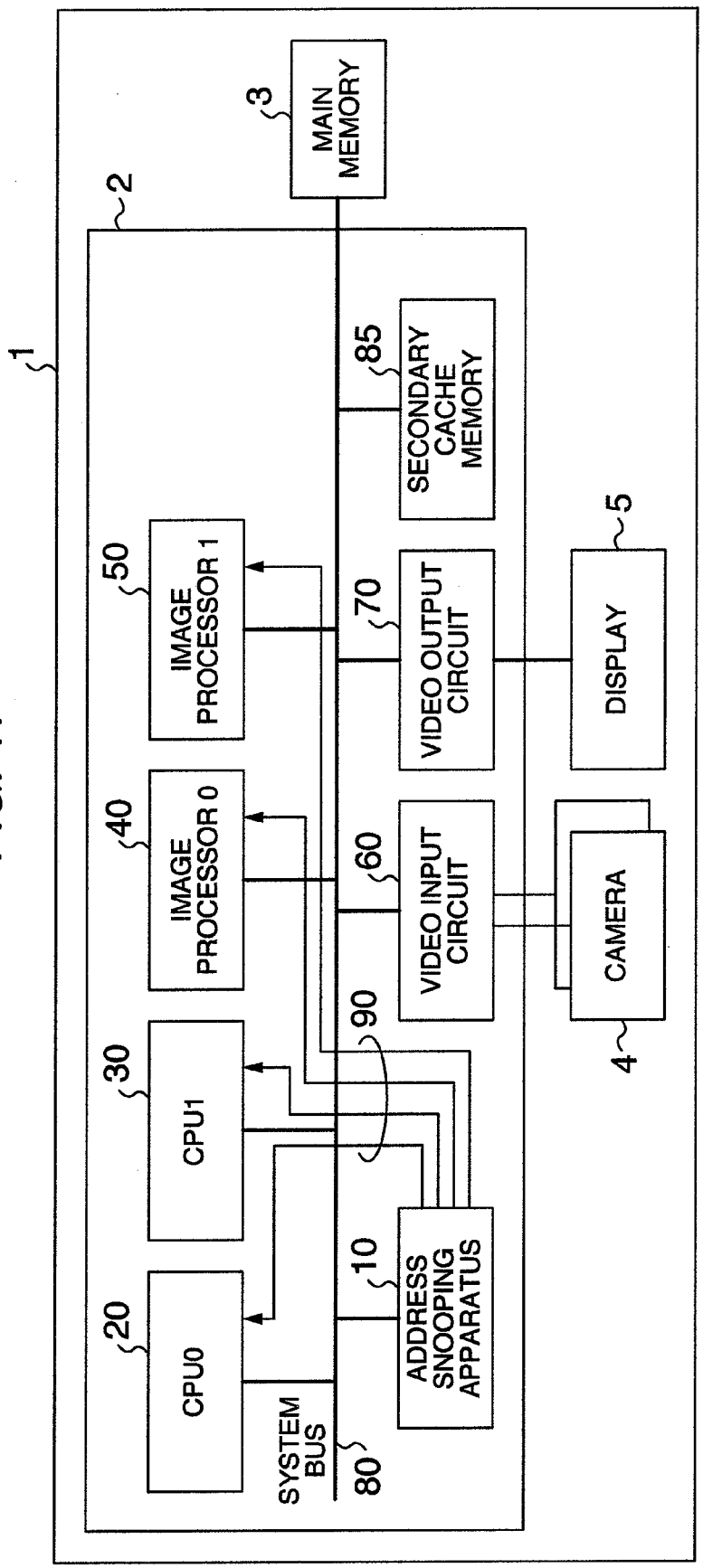
FIG. 17 is a diagram showing an image processing system in a third embodiment.

Next, a description will be concerned with a third embodiment. FIG. 17 is a diagram showing an entire constitution of an image processing system for realizing the third embodiment. This embodiment is different in that a secondary cache memory 85 is added to the system LSI 2 in comparison with the first embodiment. The secondary cache memory 85 monitors the write operation given to the main memory 3 from the CPUs 20, 30, image processors 40, 50, etc., which are connected with the system bus 80. The secondary cache memory 85 also holds write data in a predetermined cacheable memory space to be able to send it to an access source, which is faster than the main memory 3 in high speed when an access to the held data is generated.

In this way, there is no influence on the realization of the first and second embodiments even though the second cache memory 85 is used by setting the image storing area in the cacheable memory space. This is because the address snooping apparatus 10 can snoop the write address, since the write operation certainly passes through the system bus 80 when the write operation in the main memory 3 is generated. In addition, in the case where image data processed by the CPU is processed by the pipeline process in a condition where a primary cache memory built in the CPU is used for a write-back strategy, the write data does not become immediately available on the system bus. However, there is effectiveness since the primary cache memory has generally a small capacity compared with the image data, write-back data may pass through the system bus while the process runs in the CPU, and the address snooping apparatus 10 can detect the flow.

In addition, the system bus in the first to third embodiments is assumed to use a physical address bus, therefore, all of the circuits connected with the system bus are shared with the same memory space. However, the address snooping apparatus 10 in the invention does not need to limit the snooping of the physical address alone, but may be extended so that the memory access between the image processors shared with the same virtual address memory space can be monitored.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing system comprising one or more image processors and a management table to manage an access right to image data arranged on a memory to be used by the image processors, at least one of said one or more image processors being an image processor or a CPU, wherein a series of image processes are performed by cooperating the image processors in accordance with the access right, wherein the image processing system further comprises:

a pipeline processing mode that enables a write given to image data to be set in the management table by one image processor as a type of the access right and a read from one or more image processors;

an address snooping apparatus provided on a bus accessible to a memory for storing the image data, to snoop a write address in relation to the memory through the bus; and means that judges whether the write address becomes a previously set value in the management table;

wherein when the write address written in the memory is judged that it is included in an image data area set to the pipeline processing mode, the address snooping apparatus includes means to store the write address and means to read the stored write address, and wherein an image processor obtaining a read-out right of the pipeline processing mode from the management table reads out the stored write address to confirm a status of a process and judges whether an image processor's own process is started.

2. An image processing system comprising one or more image processors and a management table to manage an access right to image data arranged on a memory to be used by the image processors, at least one of said one or more image processors being an image processor or a CPU, wherein a series of image processes are performed by cooperating the image processors in accordance with the access right, wherein the image processing system further comprises:

a pipeline processing mode that enables a write given to image data to be set in the management table by one image processor as a type of the access right and a read from one or more image processors;

an address snooping apparatus provided on a bus accessible to a memory for storing the image data, to snoop a write address in relation to the memory through the bus; and means that judges whether the write address becomes a previously set value in the management table;

wherein the address snooping apparatus includes means to store an interruption trigger condition and means to generate an interrupt for the image processor when the interruption trigger condition is effected, and wherein an image processor obtaining a read-out right of the pipeline processing mode starts an image processor's own process in response to the interrupt from the address snooping apparatus.

3. The system according to claim 2, wherein the interruption trigger condition means that the write address indicated to the memory is matched with an interruption trigger address previously set by the image processor.

4. The system according to claim 3, wherein the address snooping apparatus includes means to add an auto-increment value, and adds the auto-increment value to the interruption trigger address to reset the interruption trigger address and restart an address snooping, after triggering an interrupt.

* * * * *